Jan. 10, 1928.
M. C. NEUENFELT
JOURNAL BOX
Filed April 23, 1927
1,656,125
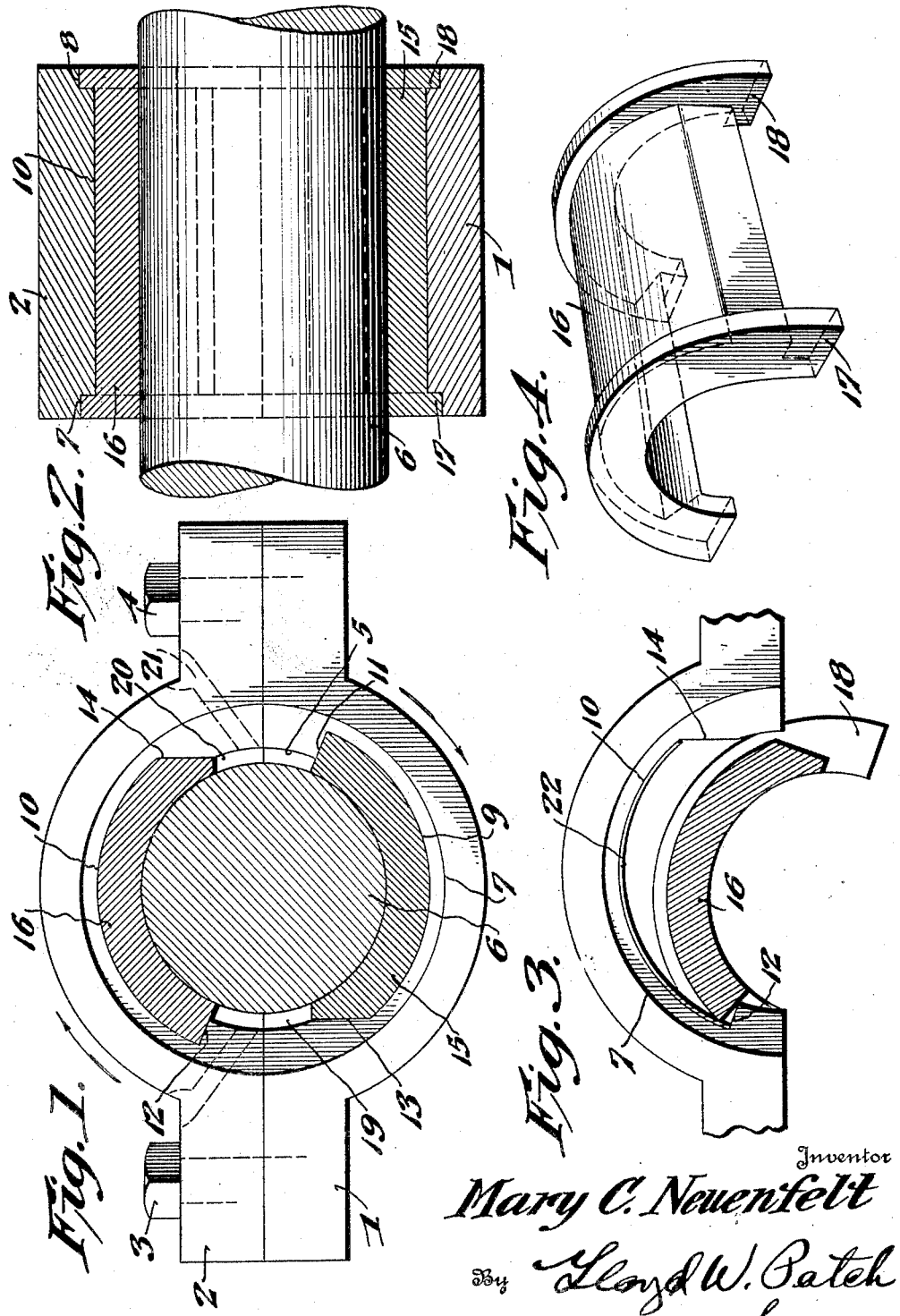
Inventor
Mary C. Neuenfelt
By Lloyd W. Patch
her Attorney Patented Jan. 10, 1928.

1,656,125

UNITED STATES PATENT OFFICE.

MARY C. NEUENFELT, OF DETROIT, MICHIGAN.

JOURNAL BOX.

Application filed April 22, 1927. Serial No. 186,136.

This invention relates to improvements in journal boxes, and particularly to journal boxes intended and adapted for use in automobile engines and in other like connection, where heating and scoring through binding of the bearing and improper lubrication are hazards to be overcome.

An object of my invention is to provide a journal box having bushings or linings which are of such form that the shaft cannot be pinched to bind within the bearing, and in so constructing the parts that even distribution of oil and proper lubrication will be accomplished at all times.

Another object resides in so constructing and mounting the bushings or linings that they can be readily fitted in place and removed and can be adjusted to take up wear, and that there will be no possibility of the bearings shifting to pinch or bind upon the shaft.

With the above and other objects in view, which will be apparent to those skilled in the art, this invention includes certain novel features of construction and combination of parts which will be hereinafter set forth in connection with the drawing and then particularly pointed out in the claims.

In the drawings:

Figure 1 is a view in side elevation of a journal box constructed in accordance with my invention, parts being in section to better illustrate the construction.

Fig. 2 is a vertical sectional view through the journal box.

Fig. 3 is a fragmentary view with parts in section to show the manner of inserting and removing the bushings.

Fig. 4 is a perspective view showing one of the bushings or linings.

The journal box illustrated in the present instance consists of the two members 1 and 2 held together by bolts 3 and 4, or other suitable fastenings, and it will be appreciated that these are more or less conventional showings as my invention is adaptable to substantially all forms and types of journal bearings.

The members 1 and 2 are turned out or are otherwise formed to make the bearing opening 5 therein of greater diameter than the shaft 6 and at each side the annular grooves or recesses 7 and 8 are divided. The substantially semi-circular bearing recesses 5 in the two members 1 and 2 are recessed in their middle portions concentrically around the axial center of the bearing as at 9 and 10, the ends of these recesses 9 and 10 being stopped substantially one-sixteenth of the circumference from the abutting face of the two members 1 and 2. The recesses 9 and 10 are of substantially the same form but are reversed on the two members and the forward ends 11 and 12 of the recesses, considering that the shaft revolves in the direction indicated by the arrows in Fig. 1, are formed on substantially radial planes, the remaining ends 13 and 14 being formed on planes substantially at right angles to the abutting faces of the two members.

The bushings or linings 15 and 16 are shaped to fit within recesses 9 and 10 and project into the journal box beyond the face of the recess 5 in members 1 and 2 to engage with shaft 6 and support the same entirely out of contact with the members 1 and 2.

The bushings or linings 15 and 16 have flanges 17 and 18 at their ends received in the annular grooves 7 and 8 and extending to abut on a line substantially coincident with the abutting faces of the two members 1 and 2. These flanges 17 and 18 form oil reservoirs or recesses at 19 and 20, and ducts 21 are provided to conduct oil to these recesses or reservoirs.

By constructing the bushings or linings 15 and 16 in the manner set forth, the shaft 6 is in contact with these bushings on its upper and lower sides throughout substantially three-eighths of its circumference on the two diametrically opposite sides, and there is no possibility of the shaft pinching or binding within the bushings or linings. These bushings can be readily inserted and removed after the manner illustrated in Fig. 3, and with the shaft revolving as indicated by the arrows in Fig. 1 there is no possibility of the bushings tilting or rocking within the recesses 9 and 10 to bind against the shaft.

When the bearing bushings become worn to require adjustment, this can be taken care of by removing the member 2 and taking out the bushing 16 sufficiently to place a thin shim or liner 22 within the recess 10, following which the bushing 16 is again fitted in place and the member 2 can be replaced in position upon the shaft 6. If the thickness of the shim 22 requires, the ends of the flanges 17 and 18 and the ends of the bushing 16 fitting the ends 12 and 14 of the recess 10 can be dressed down slightly to give a proper fit.

With the use of my improved bearing oil within the stored places or reservoirs 19 and 20 will be at all times in contact with the sides of the shaft 6, the forward end of bushing 16 serving to wipe off the excess oil and the inclination of the forward end of bushing 15 insuring the collection of oil at this point to extend the entire length of the bearing when the overflow reaches shaft 6.

While I have herein shown and described only certain specific embodiments of my invention it will be appreciated that changes and variations can be made in the form, arrangement and construction of parts and in the manner of assembling the bearing structure, without departing from the spirit and scope of my invention.

I claim:

1. A shaft journal box comprising two members to be secured together in abutting relation and having recesses therein forming a central opening of greater diameter than the diameter of the shaft, said members each being recessed within the central opening intermediate the points of abutment and said recesses being formed with the forward end upon a substantially radial plane and the remaining end on a plane substantially at right angles to the abutment faces of the two members, and bushings of corresponding form to be fitted substantially radially within the last-mentioned recess and to extend therefrom to contact with the shaft.

2. A shaft journal box comprising two members to be secured together in abutting relation and having recesses therein forming a central opening of greater diameter than the diameter of the shaft, said members each being recessed within the central opening intermediate the points of abutment and said recesses being formed with the forward end upon a substantially radial plane and the remaining end on a plane substantially at right angles to the abutment faces of the two members, bushings of corresponding form to be fitted substantially radially within the last-mentioned recess and to extend therefrom to contact with the shaft, said bushings having their ends spaced from the abutment points of the two members to provide oil reservoirs, annular grooves on opposite sides of the bearing members around the central recesses, and flanges on the ends of the bushings to lie within said annular grooves and extending to abut at their ends to close the oil reservoirs.

In testimony whereof I affix my signature.

MARY C. NEUENFELT.